INVENTOR.
GEORGE BRUCK
BY Charles M. Hogan
Gary M Gron
ATTORNEYS.

| MAGNET 64 1 | MAGNET 66 3 | MAGNET 68 9 | INDUCTANCE L |
|---|---|---|---|
| 0 | 0 | 0 | 14 L |
| 1 | 0 | 0 | 13 L |
| -1 | 1 | 0 | 12 L |
| 0 | 1 | 0 | 11 L |
| 1 | 1 | 0 | 10 L |
| -1 | -1 | 0 | 9 L |
| 0 | 1 | 1 | 8 L |
| 1 | -1 | 1 | 7 L |
| -1 | 0 | 1 | 6 L |
| 0 | 0 | 1 | 5 L |
| 1 | 0 | 1 | 4 L |
| -1 | 1 | 1 | 3 L |
| 0 | 1 | 1 | 2 L |
| 1 | 1 | 1 | L |

INVENTOR.
GEORGE BRUCK
BY Charles M. Hogan
Gary M. Gron
ATTORNEYS.

3,519,918

FERRITE CORE INDUCTOR IN WHICH FLUX PRODUCED BY PERMANENT MAGNETS IS DECREASED IN DISCRETE STEPS

George Bruck, Cincinnati, Ohio, assignor to Avco Corporation, Cincinnati, Ohio, a corporation of Delaware
Filed Nov. 9, 1967, Ser. No. 687,948
Int. Cl. G05f 7/00
U.S. Cl. 323—89 2 Claims

ABSTRACT OF THE DISCLOSURE

A variable inductor for use in a radio frequency tuner. The device comprises an inductance winding completely enclosed by a ferrite core. The winding and ferrite core form the inductance parameter of a pi network tuning system positioned between an R.F. (radio frequency) amplifier and an antenna. A pair of ring magnets are positioned on opposite sides of the core and encircuited magnetically in such a manner as to maintain a steady state magnetic bias across the ferrite core. The magnets are demagnetized or magnetized by means of a control winding to vary the magnetic bias across the core and therefore vary the inductance of the inductance winding. Thus, the permeability of the core and the inductance of the winding are maintained at any given value within a range without the expenditure of electrical power. The control winding is supplied with current from a control system which utilizes signals relating to the degree of mismatch or mistuning to change the inductance and to obtain a matched impedance condition or a resonant condition.

The present invention relates to inductance devices and more specifically to variable inductance devices.

It is an object of the present invention to provide an inductance device which requires the expenditure of power only to change the magnitude of inductance from one level to another.

It is a further object to provide a variable inductance device with the ability to maintain in memory a previously selected inductance value until a new value is selected.

It is still a further object to provide an inductance of the above type which is compact, economical and highly effective for use in an antenna coupling system, or in any environment in which a stepped sequence of inductance values is desired.

The above-related objects and features of the present invention will be apparent from a reading of the description of the disclosure found in the accompanying drawings and the novelty thereof as pointed out in the appended claims.

Figure 1:
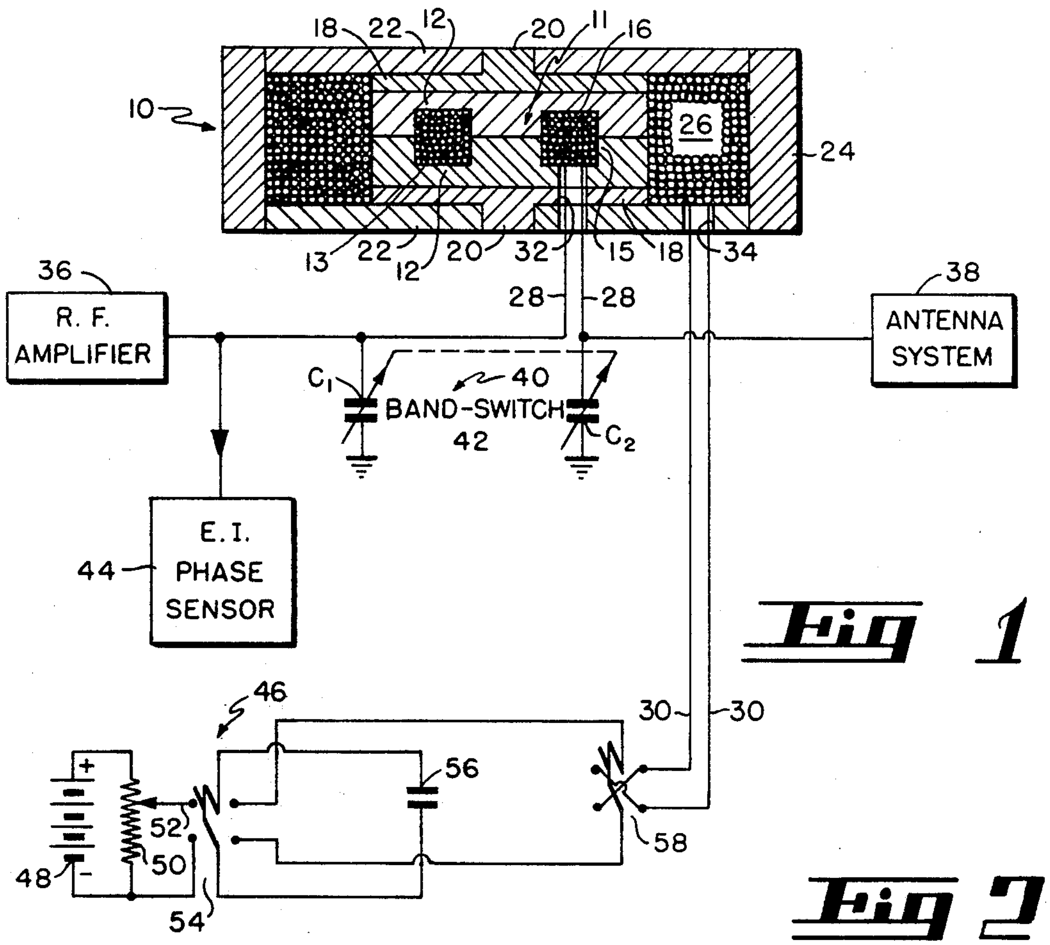
FIG. 1 is a longitudinal section view of a preferred form of inductance device embodying the present invention, together with the related portions of an antenna coupling system and control system therefor.

The present invention provides an inductance which is variable in discrete steps and it has a memory in the sense that once the inductance is set at a particular magnitude, it will retain that magnitude until it is set at another magnitude. This adjustable inductor possesses the advantage that maintenance of any one of a large number of discrete inductance values, selectable in a step-by-step manner, involves no application of electrical energy or expenditure of power. Power is utilized only during the transition from one value of inductance to another value.

For purposes of illustration, the various embodiments of the present invention are described as providing the variable inductance parameter L in a tuning network. In this connection reference is made, for example, to the copending patent application of McNair, Bruck and Hoffman, Ser. No. 599,096, filed in the United States Patent Office on Dec. 5, 1966, and assigned to the same assignee as the present application and invention. That patent application shows an automatic digital tuning apparatus in which the output of a power amplifier is tuned to resonance with an antenna system by the use of a pi type network comprising capacitance parameters $C_1$ and $C_2$ and an inductance parameter L. The system there shown calls for a variable inductance parameter. For any given operating frequency there is an appropriate set of capacitance and inductance parameters, which may be predetermined and made available. The operation of the automatic digital tuning apparatus shown in the above-referred-to copending patent application is such that whenever the system is switched from one frequency to another, so that a new set of parameters is to be selected, the capacitance parameters are first switched into place by programming and then the desired one of the available inductance parameters is selected. This is accomplished by a series of successive approximations and test procedures, by which the largest inductor is first inserted in the network and then a test for resonance is made by a suitable sensor. If resonance is not indicated, the next largest inductance parameter is tried and the test is again made. This series of approximations continues automatically until the required inductance parameter is in the tank circuit of the coupling network.

In the system shown in the aforesaid patent application there are ten lumped inductances representing selectable inductance parameters. The selection is accomplished by switching circuitry. The values of these inductances are related to each other in a binary progression ranging from .01 microhenry to 512 microhenries. It will be readily apparent to those of skill in the art that a single suitably adjusted variable inductor is theoretically capable of replacing at least several of these discrete lumped inductors illustrated in FIG. 3 of the aforementioned patent application, such as the three smallest inductors in the lower part of FIG. 3, together with their associated switching networks. This illustrates one of many fields of utility of the present application and invention.

The invention is of utility in any environment in which mistuning is sensed by an error signal device or other sensor and a control signal is utilized to accomplish tuning by suitable selection from among lumped inductances or by adjustment of an inductor variable in steps. Accordingly, the inductance shown in the present patent application is illustrated as an L parameter in a generalized control system.

A similar environment in which the invention is of utility is in that illustrated by the antenna coupled system of Bernard J. Beitman, U.S. patent application Ser. No. 534,457 filed Mar. 15, 1966, now U.S. Pat. 3,390,337, issued June 25, 1968, and assigned to the same assignee as the present patent application and invention. The last-mentioned patent application shows a T type network, interposed between the output of an R.F. amplifying system and an antenna system, for the purpose of accompanying an impedance match between the two. Loading and phase discriminators sense mismatch and, respectively, control motors which adjust the capacitance and inductance parameters in the T type matching network, in such fashion as to cause mismatch to be corrected and to match the driver amplifier to the antenna for maximum power transfer conditions. Here again, a condition of impedance mismatch is sensed by a suitable sensing device, which develops a control signal utilized to effect the selection of the desired inductance parameter to eliminate the mismatch.

This discussion does not imply that the selection of the inductance parameter alone eliminates mismatch or mistuning, as the case may be, but the present invention is concerned with the ready provision of the inductance parameter, and therefore those considerations pertinent to the selection of the capacitance parameter are irrelevant here. It is sufficient to say for present purposes that the present invention is of utility and advantage in any environment in which a unitary device is called upon to provide any value of inductance within a given range.

Referring now specifically to FIG. 1, there is shown a preferred form of variable inductance device 10 in accordance with the invention. A coil of conductive wire 16 is wrapped around center posts 11 which form the central leg portion of the magnetic circuit for the coil 16. The two leads of this winding extend to the remainder of a pi type tuning network, whereby the coil 16 and its magnetic circuit are the inductance parameter in a tuning network.

The magnetic circuit referred to above comprises a pair of circular high-Q, low hysteresis loss ferrite cups 12, 12, each of which is formed with a central boss 11, an annular recess 13, and an outer flange 15. The cups 12, 12 abut in complementary fashion to form a magnetic core which completely encloses the inductance winding 16. The central leg is formed by the abutting bosses 11. The outer legs comprise the abutting peripheral outer flange portions of the cups. The ferrite material is so selected that it has the least possible hysteresis and as straight a character as practical.

The shape of the cups 12, 12 is such that substantially all of the R.F.-generated flux is contained within them and therefore the outer faces of the cups can be lined with material of high permeability without adversely affecting the performance.

Conventionally, pole pieces of a magnet are those pieces which are disposed on each side of its air gap. In this case the pole pieces comprise soft iron discs 18, 18 of high permeability, each having a wide flat circular face and a central stem 20. The flat faces of the discs 18, 18 abut against the ends of the cup cores 12. The central stems 20, 20 project through central openings in magnetic ring members 22, 22. The members 22, 22 are permanent magnets. The magnetization is such that the upward stem 20 defines one pole region and the lower stem 20 defines the other.

The entire assembly is encased in a retainer 24 of high permeability soft iron to form a control magnetic circuit comprised in part by the cup cores 12. The use of soft iron for the retainer 24 and the pole pieces 18, 18 causes a steady state magnetic flux generated by the permanent magnets 22 to be maintained across the inductor cup cores 12. The steady-state magnetic flux across the cup cores 12 biases them to a given operating point which is dependent upon the degree of magnetization of the permanent magnets 22, 22.

Disposed in the annular chamber defined between the cups 12 and the retainer 24 is a control winding 26. The purpose of winding 26 is to generate magnetic flux through the control magnetic circuit and to demagnetize or magnetize the permanent magnets 22, 22 in steps to change the operating point of the ferrite cup cores 12.

The respective leads 28, 28 and 30, 30 of the inductance coil 16 and the control winding 26 extend from the inductance device 10 through passageways 32, 34, respectively.

The leads 28, 28 of the inductance coil 16 are series encircuited with or intercoupled between an R.F., or radio frequency, amplifier 36 and an antenna system 38. Variable shunt capacitance parameters $C_1$ and $C_2$ (variable capacitors symbolically illustrated) are connected to the leads 28 to form a pi turning network 40 which tunes the output of the R.F. amplifier system to resonance with the antenna 38 at any one of a number of preselected frequencies. The tuning to resonance, under the control of the phase sensor herein shown, may be a portion of a more complex process involving impedance matching and tuning to resonance as a stage thereof.

In the tuning system 40, impedance match and a resonant condition are approached by using a bandswitch, illustrated generally by reference character 42, or programming arrangement (not shown) to select predetermined capacitance parameters $C_1$ and $C_2$ for the particular transmission frequency desired. The output impedance of the R.F. amplifier and the input impedance of the antenna 38 then look into the input and output, respectively, of a sensor 44, such as voltage current phase sensor, which generates an output signal functionally related to the degree of mistuning of the output of the R.F. amplifier, i.e., the lead or lag between current and voltage. If it be supposed, for purposes of discussion, that the antenna is in a resonant condition and therefore is equivalent to a pure resistive parameter and if it be supposed that the output of the amplifier is sought to be made a pure resistive parameter of the same value, then precise impedance match of two impedances, each equivalent to pure resistive parameters, will be achieved. When the two impedances are in a matched condition, there are no reflections and power transfer is at a maximum. Therefore, the phase sensing device herein shown, which senses mistuning, is in a broad sense an impedance mismatch sensor.

The error signal from the sensor 44 may be indicated visually as an output used by an operator to actuate the control system, generally indicated by reference character 46. The control system 46 comprises a D.C. voltage source 48 shunted by potentiometer 50. A variable wiper arm 52 is adjusted to produce a variable voltage at the left-hand terminals of a double pole, double throw switch 54, the center terminals of which are connected to a capacitor 56. The right-hand terminals of the switch 54 are connected to the center terminals of a second double pole, double throw switch 58. The right and left hand terminals of the switch 58 are interconnected so that the position of the switch determines the polarity of pulse current passed to the control winding leads 30.

In operation of the inductance device at a particular frequency, The R.F. current oscillations in the winding 16 generate a magnetic force which causes magnetic lines of flux to be generated through the central core 11. Because the ferrite cups 12 essentially contain the lines of magnetic flux generated by the R.F. current, the effect of the R.F. current on the magnetization level of the magnets 22 is negligible. The magnetic force and lines of flux for the core 11 are related, as shown by curve A in FIG. 2. For a complete oscillation of R.F. current, the relationship between magnetizing force and flux follows a loop because of hysteresis of the ferrite material. The curve A is nonsymmetrical about the intersection of the axes because of the magnetic bias produced by the permanent magnets 22.

The changing lines of magnetic flux in the core 11 and the changing current in the winding 16 produce an inductance which is determined by the geometry of the winding 16, the geometry of the ferrite core 11, the number of turns of wire, and the magnetization curve of the core material.

The $\mu$ avg., or average permeability, may be represented adequately by dividing the change in flux density ($\Delta B$) by the change in magnetic force (ΔH) for a given oscillation of the R.F. current in the coil, as shown by loop A. This is possible because the loop produced by the amplitude of the R.F. current oscillation has a permeability $\mu$ at each point within the loop, a small variation from the avearge permeability represented by line $\mu A[(\Delta B)/(\Delta H)]$. In contrast, the variation in permeability when the core 11 would be driven to positive and negative saturation in one cycle, as shown by curve C, is quite substantial. To obtain accurate inductances from the coil 16, the magnetization curve of the core 11 has relatively low hysteresis, as previously stated, to minimize the change in permeability as the operating loops are traversed.

The loop A is shown at an operating point where a high degree of magnetic bias is impressed across the core 11 by the permanent magnets 22. At this level the average permeability ($\mu$ avg.) of the core 11 and the inductance of the winding 16 are relatively low. Another loop D is shown at a lower level of magnetic bias having an average permeability represented by line $\mu$D avg. For loop A the average permeability of the core 11 and the inductance of coil 16 is lower than that of loop D. It is apparent then that inductance increases with a decreasing level of magnetic bias across the core 11. In order that the inductance of the coil be varied by changes in magnetic bias, it is also preferable that the magnetization curve of the core smoothly change from negative to positive saturation. This magnetic bias is varied by the control system 46 which sends current pulses through the control winding 26 to magnetize or demagnetize the magnets 22, as described below. When the magnitude and polarity of the phase angle is ascertained from the sensor 44, the potentiometer 52 is adjusted so that a voltage at the left terminals of the switch 54 is present to produce a given charge on the capacitor 56 when switch 54 is thrown to the left. The switch 58 is thrown to the right or left to set up the circuitry for an electrical current pulse of the appropriate polarity to magnetize or demagnetize the magnets 22, the switch 54 is then thrown to the right so that the capacitor 56 is discharged into the control windings 26. This magnetizes or demagnetizes the permanent magnets 22 to change the inductance in a direction approaching a condition wherein the phase angle is zero.

Following this step, that is, following this selective increase or decrease of the inductance parameter, when the control system is quiescent, the phase angle is again observed. If mistuning is detected, then the control system 46 is activated to again increase or decrease the inductance parameter. When the test for resonance is satisfied, the phase angle is zero. The control circuitry for the inductor then requires no further expenditure of electrical energy until a change in operating frequency is selected.

The current control system 46 may be adapted, as is apparent to those skilled in the art, to automatically change the inductance parameter in a rapid fashion to achieve the desired level by using circuitry similar to that shown in the aforementioned copending patent application of McNair, Bruck and Hoffman, Ser. No. 599,096, filed in the United States Patent Office on Dec. 5, 1966. It should be pointed out, however, that since the magnets 22 have substantial hysteresis, it is desirable that the control system 46 in the general sense contain a logic circuit that controls the magnitude and sense of the current pulse, or in a broader sense the electrical energy level, depending upon whether the magnets are to be magnetized or demagnetized.

The following describes a preferred functional character of an automated control system 46 which eliminates the need for the sense logic referred to above and enables a substantial simplification of the circuit.

Figures 2, 3:
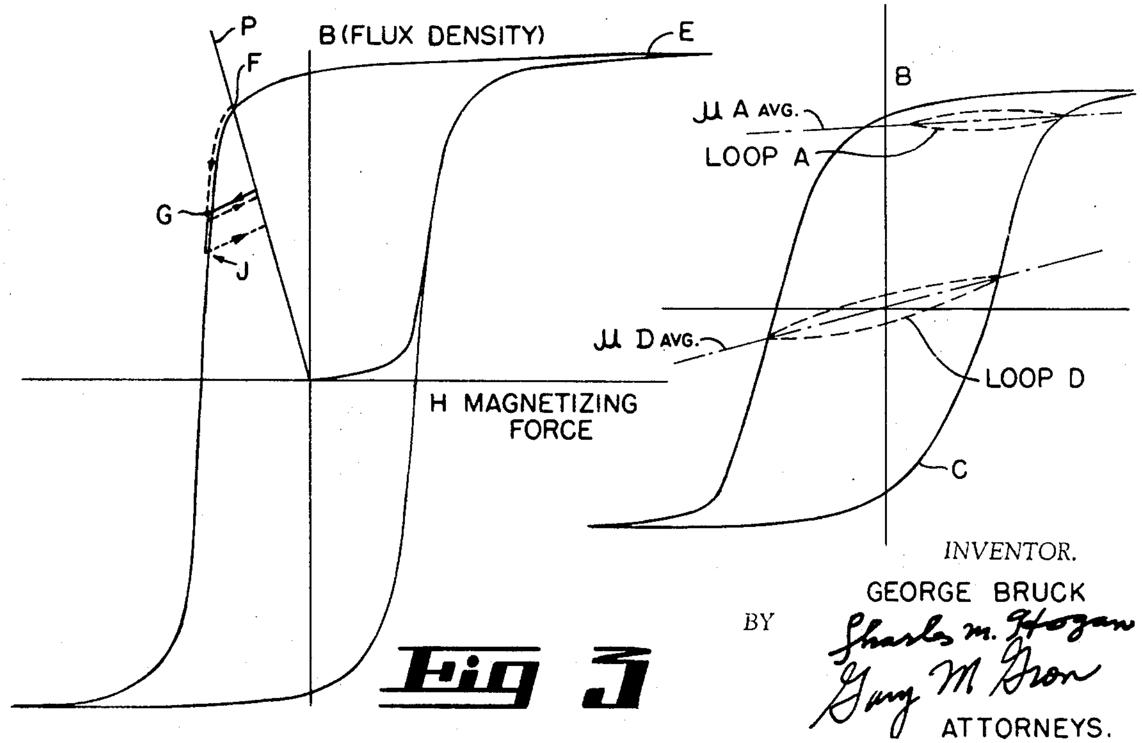
FIG. 2 illustrates a magnetization curve for a ferrite core of the inductance device shown in FIG. 1.
FIG. 3 is a magnetization curve for a pair of permanent magnets which form a magnetic circuit across the ferrite core of the inductance device shown in FIG. 1.

With reference to the magnetization curves for the permanent magnets 22 in FIG. 3, the control system 46 is actuated to generate a current pulse through the leads 30 of the control winding 26 in response to a switch in transmission frequency by the band switch 42. The current pulse is of sufficient magnitude to drive the permanent magnets 22, 22 to positive saturation, as shown by point E. When the current pulse terminates, the permanent magnet will follow the magnetization curve to point F, which is the intersection of the permanence line P of the magnetic circuit and the magnetization curve. The permanence line P is fixed by the geometry of the magnetic circuit. At this point the magnetic flux and magnetic force through the inductor core 11 are at a maximum level and the inductance of the coil 16 at a minimum.

After the current pulse terminates and after the magnets 22 reach point F, the control system 46 is actuated to generate a current pulse of a first, predetermined magnitude that generates lines of flux partially to demagnetize the magnets 22. The flux of the permanent magnets 22 in response to the first demagnetizing current pulse follows the demagnetization curve to point G and when the pulse is terminated goes to the permanence curve P (via the dotted line) at a flux density lower than the initial state. At this lower flux density the impedance of the coil 16 is higher than for that of the first state. After the current pulse is terminated the phase angle is observed. In other words, a second test for mistuning is made. If a phase angle exists and if it is necessary to further increase the inductance to null out the phase angle, a second and larger current pulse is applied to the control windings further to demagnetize the magnets 22. The flux density follows the demagnetization curve to point J and when the current pulse is removed, the flux density follows the curve to the permanence line P at an even lower flux density and magnetic force level. This process of increasing demagnetizing current pulses is repeated until the inductance parameter required for tuning is satisfied.

Preferably, the magnets 22 have a relatively linear demagnetization curve to enable selection of given values of current pulses to achieve predetermined decreases in the magnetic flux across the inductor core 11. In this manner the inductance of the coil 16 may be selected with relatively simple circuitry without the necessity for employing complex circuitry to compensate for the hysteresis effects of the magnets 22.

It should be noted that the phase sensor 44 is observed for determining the phase angle only when the current is not flowing through the control winding 26. This is done because the current pulses through the control winding 26 generate a temporary additional magnetic flux which is not present during the operation of the inductance device 10 after tuning is achieved.

Figures 4, 5:
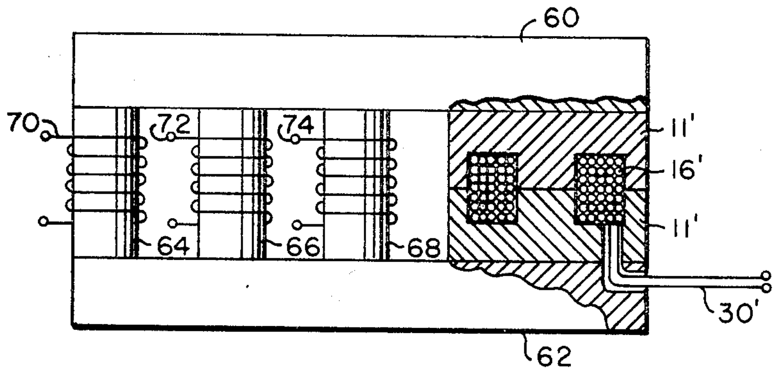
FIG. 4 illustrates a simplified view of an alternate embodiment of the inductor of FIG. 1.
FIG. 5 is a table illustrating various relative levels of inductance as a function of the magnetization state of the magnets shown in FIG. 4.

Reference is now directed to FIG. 4 which illustrates an alternate embodiment of the inductance device of the prevent invention. In this device the control winding 16' is positioned in a pair of ferrite cup cores 11' and has leads 30', 30' for connection with a suitable circuit, such as the tuning circuit illustrated in FIG. 1. A pair of soft iron bars 60, 62 are positioned on either side of the cup core inductance 11' and extend from the cup core inductor 11' to form a U-shaped magnetic circuit. A plurality of permanent magnets, herein illustrated as magnets 64, 66 and 68, are positioned so that the north pole of the magnets abut one soft iron bar and the south pole of the magnets abut another of the soft iron bars. Each of the permanent magnets 64, 66 and 68 has a control winding 70, 72 and 74, respectively. In this embodiment the magnetic bias generated across the ferrite core 11' is determined by the magnetization of the permanent magnets 64, 66 and 68. In this arrangement shown the resultant magnetic bias across the inductor core 11' is the magnetic bias produced by the sum of the magnetic bias produced.

The magnets 64, 66 and 68 are selected so that magnet 64, when positively or negatively saturated, has a given level of magnetization, magnet 66 has a level of magnetization three times that of magnet 64, and magnet 68 has a level of magnetization nine times that of magnet 64. A suitable current pulse generating system is provided for each of the control windings so that each of the magnets may be placed in a state of positive or negative saturation or at a level of zero magnetization. It is apparent that positive and negative saturation may be easily obtained by merely providing a current pulse of sufficient magnitude and direction to saturate the magnet. The complete demagnetization of the magnet is easily accomplished by applying an exponentially decreasing sine wave of current to the windings. As a result, predetermined currents may be used to achieve each of these levels which enables a substantial simplification of a control circuit.

In operation of the device, the magnets are placed in logical states to produce a given level of inductance from the inductor winding 16. The logic for these states is shown in FIG. 5, which relates the inductance level L in terms of the magnetization state of each of the magnets. The inductances shown are relative and show the range of inductances that may be achieved with the three magnets. It is apparent then that fourteen discrete levels of inductance may be attained by the use of the permanent magnets, as shown in FIG. 3. This embodiment is not limited to three permanent magnets but may include additional magnets to further increase the number of discrete levels of inductance that may be obtained.

One of the significant advantages of using a permanent magnet in the inductance device of the present invention is that the level of inductance selected may be maintained without the necessity for an external power source. In addition, the device 10 stays at the previous inductance until a new level is selected. This feature enables significant advantages when used in single sideband military equipment where no carrier signal is available and no power available for substantial periods of time between operations at a particular frequency.

As stated previously, the ferrite cups 12 completely enclose the inductor winding 16. This feature causes the magnetic lines of flux generated by the R.F. current to be substantially contained within the ferrite cup. The effect on the magnets 22 in the magnetic circuit of which the cup cores 12 are a part is therefore negligible. If it is desired to substantially eliminate the interaction, a separate pair of cup cores 12 may be stacked on top of another pair of cores and the winding 16 wound in each core so that the magnetic lines of flux oppose.

The fact that the magnetic circuit, comprised in part by the permanent magnets 22, completely surrounds the ferrite core, enables a predictable steady state flux to be maintained across the cores 12 with a minimum of loss.

While the variable inductance device has been described in terms of its preferred highly compact embodiment, it is apparent to those skilled in the art that other configurations of the inductor core and magnetic circuit may be selected without departing from the spirit of the invention. The variable inductance device 10 has been described in connection with a particular antenna coupling circuit and a particular control system, but it is to be understood that the inductance device may be used in other electrical circuits and with other control circuitry with equal advantages.

Having thus described the invention, what is claimed as novel and desired to be secured by Letters Patent of the United States is:

1. A variable inductance device comprising:

an inductance winding through which an alternating current is adapted to pass;

a ferrite core having a relatively low hysteresis magnetization curves, said core completely surrounding said inductance winding to substantially contain the lines of the magnetic flux generated by alternating current flow through said inductance winding;

means for providing a magnetic circuit completely surrounding said ferrite core to concentrate the steady-state lines of magnetic flux through said core with a minimum loss, said magnetic circuit means comprising:

a pair of high permeance pole pieces comprising discs abutting opposite sides of said ferrite core, permanent magnet means for generating steady-state lines of magnetic flux through said inductance winding whereby the inductance of said device is related to the level of magnetic flux across said ferrite core, said permanent magnet means comprising a pair of ring permanent magnets positioned on the outer surface of said pole pieces and magnetized so that the pole pieces are at opposite polarity, and a high permeability outer sleeve connecting the outer peripheries of said ring magnets for completing said magnetic circuit, said sleeve and said pole pieces and said ferrite core defining the inner and outer bounds of an annular chamber; and means for saturating and then demagnetizing said permanent magnet means in discrete steps comprising a control winding positioned around said ferrite core and in said annular chamber, and means for generating a pulse current flow through said control winding to change the level of inductance of said device.

2. A variable inductance device comprising:

a ferrite core having a relatively low hysteresis curve, an inductance winding through which an alternating current is adapted to pass, and means for providing a magnetic circuit through said core, comprising:

a pair of high permeability bars abutting opposite sides of said core, three permanent magnets for generating steady state lines of magnetic flux in said core, each permanent magnet being positioned between said bars so that the level of magnetic flux through said inductance winding is related to the sum of the magnetic fluxes produced by said magnets, said first permanent magnet having a given level of magnetization at saturation and said second permanent magnet having a level three times as great and said third permanent magnet having a level nine times as great, whereby fourteen discrete levels of magnetization and inductance may be obtained, and first, second and third control windings around each of said permanent magnets, each of said control windings being adapted individually to receive pulse current for selectively positively saturating and negatively saturating and demagnetizing its associated magnet, so that a large plurality of discrete levels of magnetization may be obtained across said core.

References Cited

UNITED STATES PATENTS

| | | | |
|---|---|---|---|
| 2,741,757 | 4/1956 | Devol et al. | 323—56 X |
| 2,786,940 | 3/1957 | Crofts | 334—12 X |
| 3,001,067 | 9/1961 | Manahan | 336—155 X |

J. D. MILLER, Primary Examiner

A. D. PELLINEN, Assistant Examiner

U.S. Cl. X.R.

323—92; 325—173, 176; 334—12, 14; 336—110